(12) United States Patent
Sammel, Jr. et al.

(10) Patent No.: US 8,391,375 B2
(45) Date of Patent: Mar. 5, 2013

(54) WIRELESS AUTONOMOUS DEVICE DATA TRANSMISSION

(75) Inventors: David W. Sammel, Jr., Pittsburgh, PA (US); James T. Cain, Pittsburgh, PA (US); Marlin H. Mickle, Pittsburgh, PA (US); Minhong Mi, Pittsburgh, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 1706 days.

(21) Appl. No.: 11/743,938

(22) Filed: May 3, 2007

(65) Prior Publication Data
US 2007/0258535 A1 Nov. 8, 2007

Related U.S. Application Data

(60) Provisional application No. 60/798,404, filed on May 5, 2006.

(51) Int. Cl.
*H04L 27/00* (2006.01)
*G08B 13/14* (2006.01)

(52) U.S. Cl. ................................ 375/259; 340/572.1

(58) Field of Classification Search ................ 375/354, 375/359, 361, 374, 259; 340/10.1, 10.4, 340/572.1, 3.55, 12.18; 327/141, 148
See application file for complete search history.

(56) References Cited

U.S. PATENT DOCUMENTS

| | | | |
|---|---|---|---|
| 4,724,427 A | 2/1988 | Carroll | |
| 4,857,893 A | 8/1989 | Carroll | |
| 5,111,213 A | 5/1992 | Jahoda et al. | |
| 5,296,866 A | 3/1994 | Sutton | |
| 6,127,799 A | 10/2000 | Krishnan | |
| 6,289,237 B1 | 9/2001 | Mickle et al. | |
| 6,373,447 B1 | 4/2002 | Rostoker et al. | |
| 6,615,074 B2 | 9/2003 | Mickle et al. | |
| 6,734,797 B2 | 5/2004 | Shanks et al. | |
| 6,847,844 B2 | 1/2005 | Sun et al. | |
| 6,856,291 B2 | 2/2005 | Mickle et al. | |
| 7,057,514 B2 | 6/2006 | Mickle et al. | |
| 7,084,605 B2 | 8/2006 | Mickle et al. | |
| 2002/0149480 A1* | 10/2002 | Shanks et al. | 340/572.1 |
| 2003/0019929 A1* | 1/2003 | Stewart et al. | 235/385 |
| 2005/0201450 A1* | 9/2005 | Volpi et al. | 375/150 |
| 2007/0008072 A1* | 1/2007 | Pillai et al. | 340/10.4 |

* cited by examiner

*Primary Examiner* — David C. Payne
*Assistant Examiner* — Vineeta Panwalkar
(74) *Attorney, Agent, or Firm* — Eckert Seamans Cherin & Mellott, LLC; Philip E. Levy

(57) ABSTRACT

A method of communicating information from a wireless autonomous device (WAD) to a base station. The WAD has a data element having a predetermined profile having a total number of sequenced possible data element combinations. The method includes receiving at the WAD an RF profile transmitted by the base station that includes a triggering portion having a number of pulses, wherein the number is at least equal to the total number of possible data element combinations. The method further includes keeping a count of received pulses and wirelessly transmitting a piece of data, preferably one bit, to the base station when the count reaches a value equal to the stored data element's particular number in the sequence. Finally, the method includes receiving the piece of data at the base station and using the receipt thereof to determine which of the possible data element combinations the stored data element is.

20 Claims, 7 Drawing Sheets

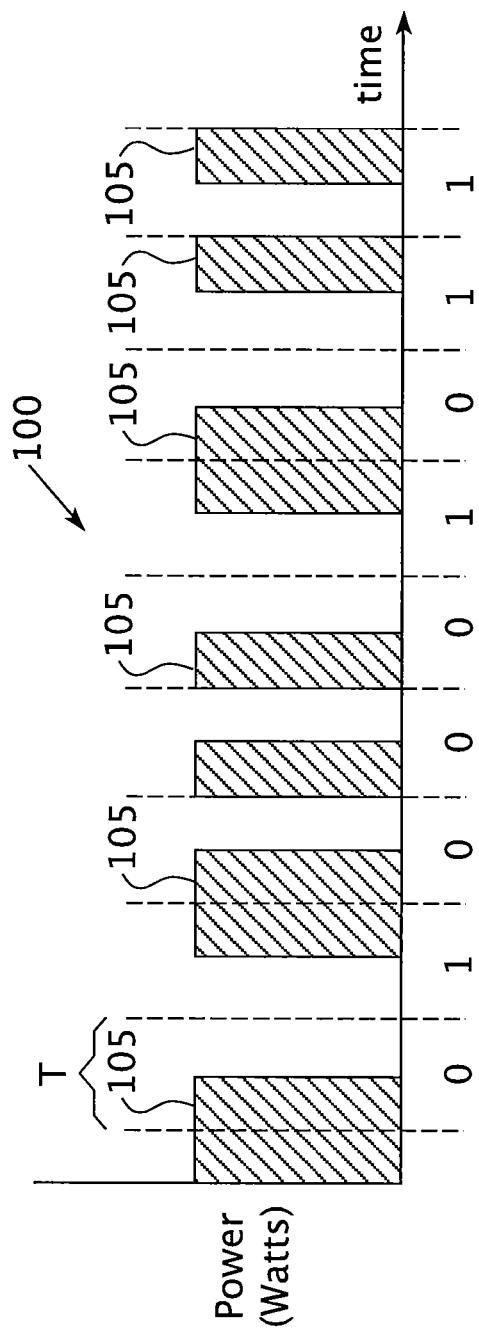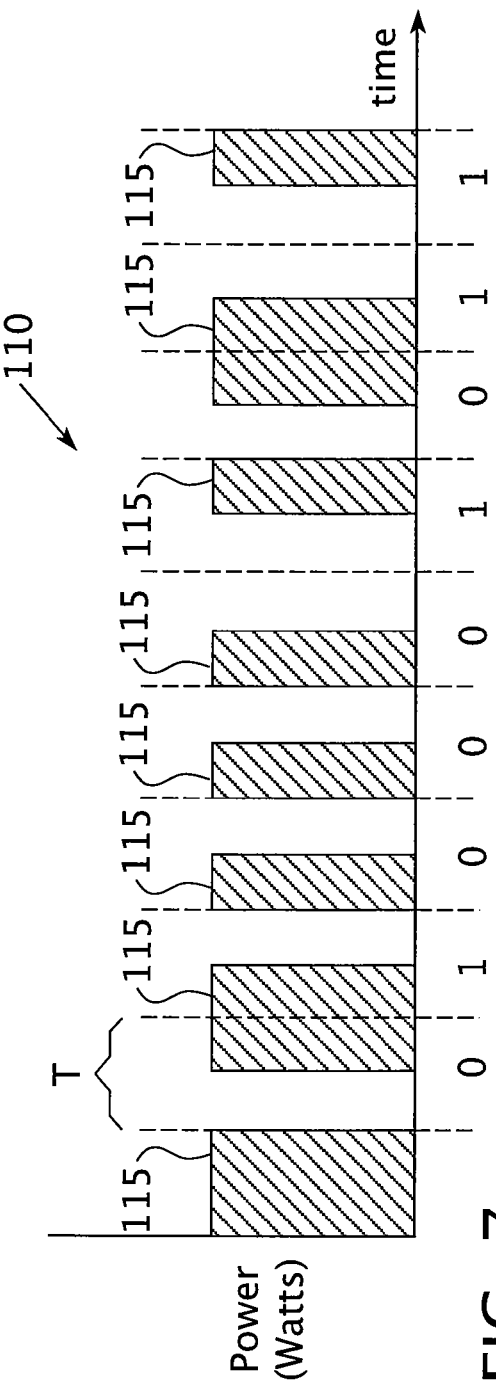

WIRELESS AUTONOMOUS DEVICE DATA TRANSMISSION

CROSS-REFERENCE TO RELATED APPLICATION

This application claims the benefit of U.S. Provisional Application No. 60/798,404, entitled "Device Data Transmission," which was filed on May 5, 2006, the disclosure of which is incorporated herein by reference.

GOVERNMENT CONTRACT

This work was supported in part by a grant from NASA under Contract No. NNK040A29C. The United States government may have certain rights in the invention described herein.

FIELD OF THE INVENTION

The present invention relates to wireless autonomous devices, and in particular to the transmission of data from wireless autonomous devices to a base station in a manner that conserves power.

BACKGROUND OF THE INVENTION

A wireless autonomous device (WAD) is an electronic device that has no on board battery or wired power supply. WADs are powered by receiving radio frequency (RF) energy that is either directed toward them (a directed source) or is ambient and converting the received RF energy into a direct current (DC) voltage. The DC voltage is used to power on-board electronics, such and a microprocessor and/or sensing circuitry, and an RF transmitter which communicates information, such as a sensor reading, to a remote receiver, commonly referred to as a base station. WADs are employed in a number of fields, such as radio frequency identification (RFID) systems (wherein the WADs are radio frequency tags or transponders), security monitoring and remote sensing, among others. WADs are particularly desirable in certain applications as they have essentially an infinite shelf life and do not require wiring because, as described above, they are powered by RF energy transmitted through the air. As described elsewhere herein, the RF energy that is transmitted through the air for powering WADs may be continuous wave RF energy and/or pulsed RF energy.

The transmission of data, such as measurement data, from a WAD to a base station is a major draw on the power of the WAD. In some applications, this power draw represents a major limiting factor. In a situation where a WAD employs a sensor to measure a parameter of interests, the act of conducting a measurement and then transmitting the measured data to the base station is typically triggered by either the receipt of a command transmitted from the base station to the WAD or through some clock or synchronization scheme. The typical measurement recorded by such a WAD is in a digital format of, for example, 8 to 16 bits of information. In other words, the measured data is transmitted by the WAD in the form of an 8 to 16 bit binary word. The WAD frames this digital information and transmits the entire bit profile to the base station. It is this type of transmission that is the fundamental draw of power limiting the range of the passive WAD (as compared to the data transmission phase, a relatively low amount of power is consumed by the WAD when it is not transmitting, including when it is receiving data transmitted from the base station). If the amount of power transmitted can be reduced, the range of a WAD can be greatly extended.

SUMMARY OF THE INVENTION

In one embodiment, the present invention provides a method of communicating information from a wireless autonomous device to a base station. The wireless autonomous device has a stored data element having the form of a predetermined profile that has a total number of sequenced possible data element combinations. The stored data element is one of the possible data element combinations and is a particular number in the sequence. The method includes receiving at the wireless autonomous device RF energy in the form of an RF transmitting profile transmitted by the base station. The RF transmitting profile includes a triggering portion that includes a plurality of RF pulses, wherein the number of the pulses is at least equal to the total number of possible data element combinations. The method further includes keeping a count of received pulses at the wireless autonomous device by counting each of the pulses when the pulses are received and wirelessly transmitting a piece of data, preferably one bit of data, to the base station from the wireless autonomous device when the count of received pulses reaches a value equal to the stored data element's particular number in the sequence. Finally, the method includes receiving the piece of data at the base station, and using the receipt of the piece of data at the base station to determine which of the possible data element combinations the stored data element is.

The using step may include using the timing of the receipt of the piece of data at the base station to determine which of the possible data element combinations the stored data element is. In one particular embodiment, the method further includes keeping a count of transmitted pulses on the base station by counting the pulses transmitted by the base station as part of the triggering portion of the RF transmitting profile as the pulses are transmitted. In this embodiment, the step of using the receipt of the piece of data at the base station to determine which of the possible data element combinations the stored data element is uses a value of the count of transmitted pulses when the piece of data is received by the base station to determine which of the possible data element combinations the stored data element is.

In the preferred embodiment, the predetermined profile is a fixed length bit profile, such as an 8-bit binary bit profile, and the stored data element is a particular fixed length bit string. In this embodiment, the possible data element combinations are all of the possible bit string combinations, which in the case of an 8-bit binary bit profile would be 256 combinations ($2^8$).

The RF transmitting profile may further include a preamble portion prior to the triggering portion. In such a case, the method further includes using the preamble portion to determine when to begin the step of keeping a count of received pulses. The preamble portion may also include device identifying information which uniquely identifies the wireless autonomous device out of a group of such devices. In this embodiment, the method further includes determining at the wireless autonomous device whether the device identifying information identifies the wireless autonomous device, wherein the keeping and transmitting steps are only performed if it is determined that the device identifying information does indeed identify the wireless autonomous device. The preamble portion may include pulsed RF energy, or, alternatively, continuous wave RF energy. Furthermore, the RF energy in the form of an RF transmitting profile is preferably used to provide power to the wireless autonomous device.

In another embodiment, the present invention provides a wireless autonomous device system that includes a base station and at least one wireless autonomous device having a stored data element having the form of a predetermined profile. The predetermined profile has a total number of sequenced possible data element combinations, wherein the stored data element is one of the possible data element combinations and is also a particular number in the sequence. The base station is structured to transmit to the wireless autonomous device RF energy in the form of an RF transmitting profile including a triggering portion including a plurality of pulses, wherein the number of the pulses is equal to the total number of possible data element combinations. Furthermore, the wireless autonomous device is structured to receive the RF energy, keep a count of received pulses by counting each of the pulses when the pulses are received, and wirelessly transmit a piece of data (preferably a single bit) to the base station when the count reaches a value equal to the particular number in the sequence. The base station is structured to receive the piece of data and use the receipt of the piece of data to determine which of the possible data element combinations the stored data element is. The system just described may implant any of the method embodiments just described.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

FIGS. 6 and 7 are schematic illustrations of different embodiments of a pulsed RF transmitting profile that may be used to provide power by energy harvesting to one or more wireless autonomous devices as described herein while simultaneously communicating information to the wireless autonomous devices based on the state changes occurring in the RF transmitting profile;

DESCRIPTION OF THE PREFERRED EMBODIMENTS

Figure 1:
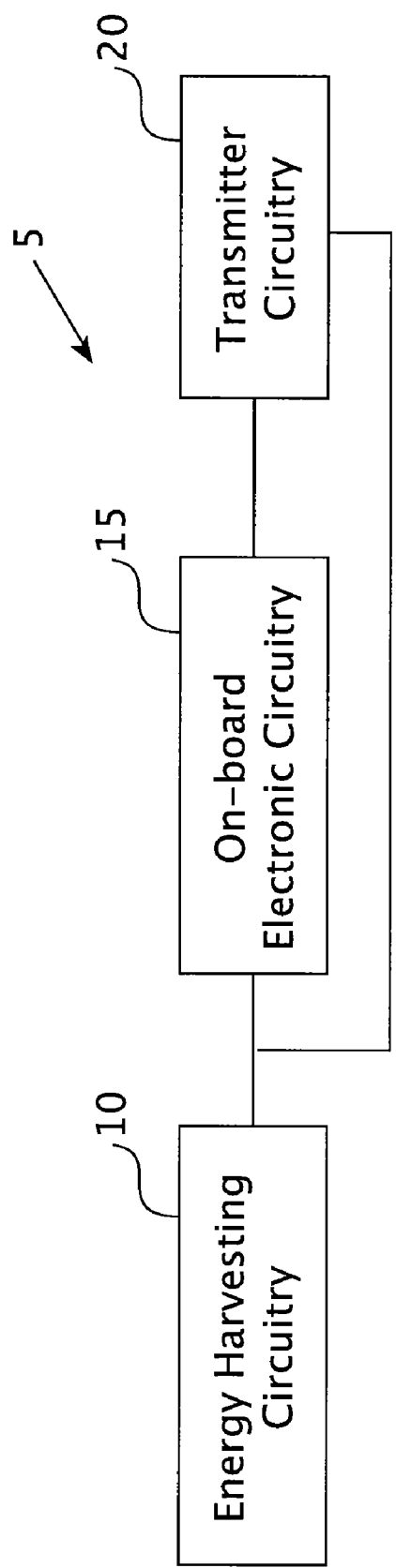
FIG. 1 is a block diagram of an embodiment of a wireless autonomous device that may be employed in the embodiments of the invention as described herein.

FIG. 1 is a block diagram of an embodiment of a wireless autonomous device (WAD) 5 that may be employed in the embodiments of the invention as described herein. The WAD 5 includes energy harvesting circuitry 10 that is operatively coupled to on-board electronic circuitry 15, which in turn is operatively coupled to transmitter circuitry 20. In operation, the energy harvesting circuitry 10 is structured to receive RF energy of a particular RF frequency range and harvest energy therefrom by converting the received RF energy into DC energy, e.g., a DC voltage. As used herein, the term "RF frequency range" or "frequency range" shall refer to either a single RF frequency or a band of multiple RF frequencies. The DC voltage is then used to power the on-board electronic circuitry 15 and the transmitter circuitry 20. The transmitter circuitry 20 is preferably structured to transmit an RF information signal to a receiving device at a frequency range that is different from the frequency range of the RF energy received by the energy harvesting circuitry 10. The transmitter circuitry 20 is capable of transmitting RF information signals that include, for example, data that identifies the WAD 5 and/or data that is sensed by a component provided as part of the on-board electronic circuitry 15. However, according to an aspect of the present invention described in more detail herein, the transmitter circuitry 20 is adapted to transmit a single bit of data at a particular time in synchronization with the associated base station.

Figure 2:
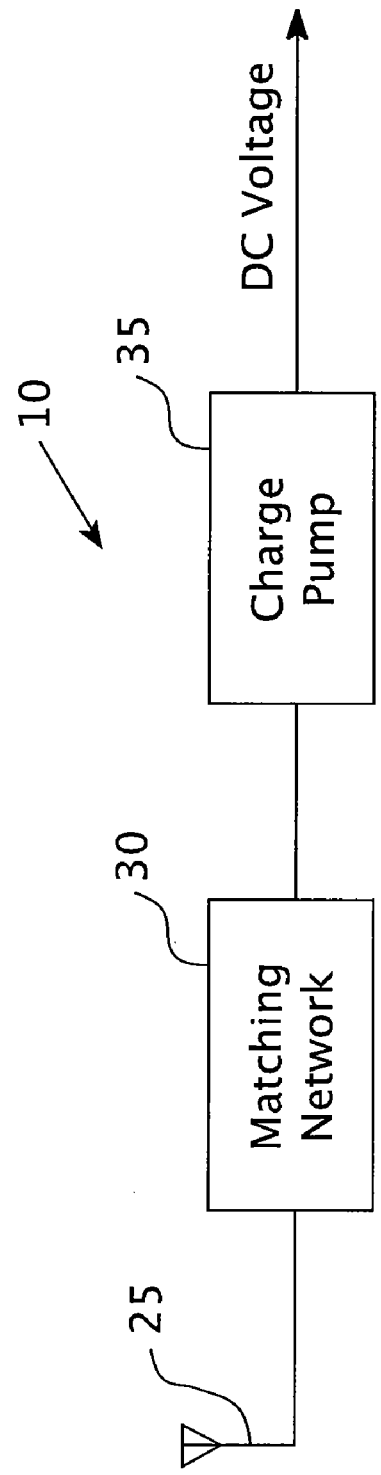
FIG. 2 is a particular embodiment of the energy harvesting circuitry of the wireless autonomous device of FIG. 1.

In a particular embodiment, shown in FIG. 2, the energy harvesting circuitry 10 includes an antenna 25 which is electrically connected to a matching network 30, which in turn is electrically connected to a voltage boosting and rectifying circuit preferably in the form of a one or more stage charge pump 35. Charge pumps are well known in the art. Basically, one stage of a charge pump essentially doubles the effective amplitude of an AC input voltage with the resulting increased DC voltage appearing on an output capacitor. The voltage could be stored using a rechargeable battery. Successive stages of a charge pump, if present, will essentially increase the voltage from the previous stage resulting in an increased output voltage. In operation, the antenna 25 receives RF energy that is transmitted in space by a far-field source, such as an RF source. The RF energy received by the antenna 25 is provided, in the form of an AC signal, to the charge pump 35 through the matching network 30. The charge pump 35 rectifies the received AC signal to produce a DC signal that is amplified as compared to what it would have been had a simple rectifier been used. In one particular embodiment, the matching network 30 is chosen (i.e., its impedance is chosen) so as to maximize the voltage of the DC signal output by charge pump 35. In other words, the matching network 30 matches the impedance of the antenna 25 to the charge pump 35 solely on the basis of maximizing the DC output of the charge pump 35. In the preferred embodiment, the matching network 30 is an LC circuit of either an L topology (which includes one inductor and one capacitor) or a π topology (which includes one inductor and two capacitors) wherein the inductance of the LC circuit and the capacitance of the LC circuit are chosen so as to maximize the DC output of the charge pump 35. In one embodiment, an LC tank circuit may be formed by the inherent distributed inductance and inherent distributed capacitance of the conducing elements of the antenna 25, in which case the antenna is designed and laid out in a manner that results in the appropriate chosen L and C values. Furthermore, the matching network 30 may be chosen so as to maximize the output of the charge pump 35 using a trial and error ("annealing") empirical approach in which various sets of inductor and capacitor values are used as matching elements in the matching network 30, and the resulting output of the charge pump 35 is measured for each combination, and the combination that produces the maximum output is chosen.

Figure 3:
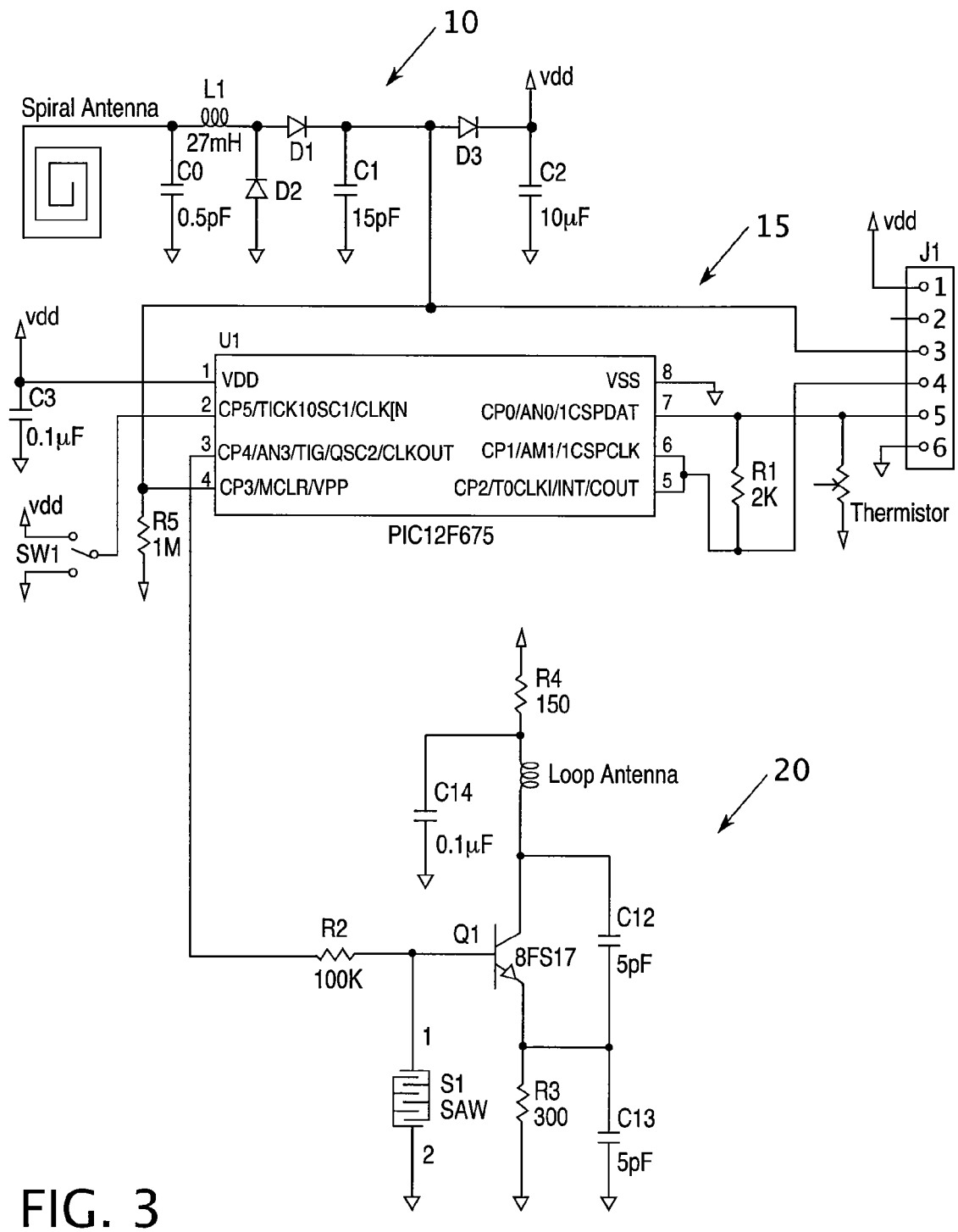
FIG. 3 is a circuit diagram of one particular embodiment of the wireless autonomous device of FIG. 1.

Referring again to FIG. 1, the on-board electronic circuitry 15 may include, for example, a processing unit, such as, without limitation, a microprocessor, a microcontroller or a PIC processor, additional logic circuitry, and a sensing circuit for sensing or measuring a particular parameter (such as temperature, in which case a thermistor may be included in the sensing circuit). As described above, these components are powered by the DC voltage output by the energy harvesting circuitry (e.g., the DC voltage output by the charge pump 35 shown in FIG. 2). In addition, the transmitter circuitry 20 includes an RF transmitter, which may be formed from discrete components or provided as a single IC chip, and a transmitting antenna. As described above, the transmitter circuitry 20 is also powered by the DC voltage output by the energy harvesting circuitry 10 and is structured to transmit an RF information signal at a frequency that is preferably different from the frequency range of the RF energy received by the energy harvesting circuitry 10. As described elsewhere herein, the timing of the RF information signal is based on information generated by the on-board electronic circuitry 15, which timing is used by the base station to discern certain particular datum information. For example, the transmitter circuitry 20 may transmit an RF signal at a particular time in order to represent a temperature as measured by a thermistor provided as part of the on-board electronic circuitry 15. FIG. 3 is a circuit diagram of one particular embodiment of a WAD 5 that employs a thermistor as described above in which the energy harvesting circuitry 10, the on-board electronic circuitry 15, and the transmitter circuitry 20 are labeled.

Figure 4:
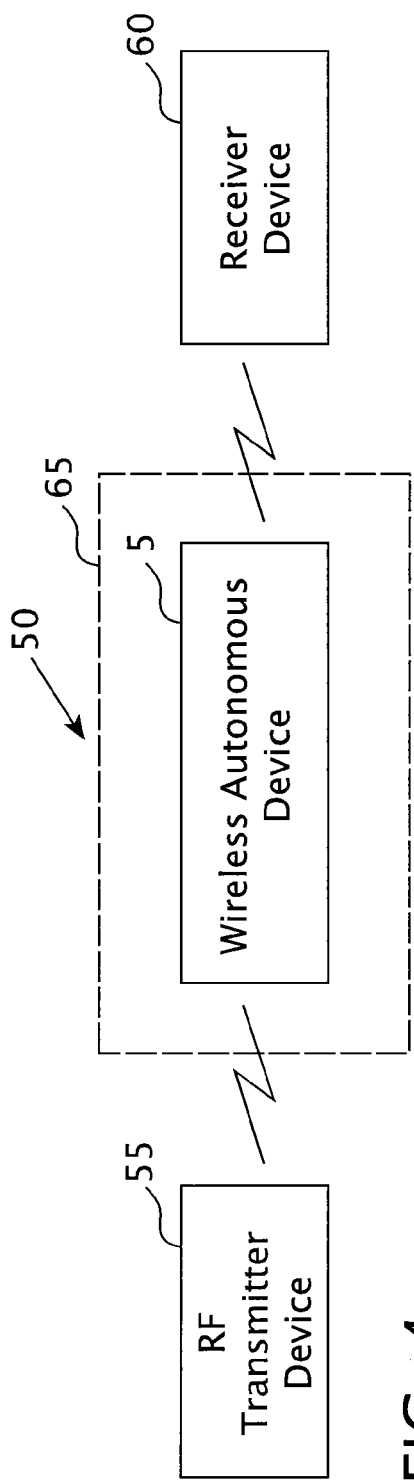
FIG. 4 is a schematic illustration of a wireless autonomous device system according to an embodiment of the invention in which a plurality of wireless autonomous devices, such as in the form of RFID tags, may be employed.

FIG. 4 is a schematic illustration of a WAD system 50 in which a plurality of WADs 5, such as in the form of RFID tags, may be employed. For convenience, only a single WAD 5 is shown in FIG. 4, but it should be understood that this is for illustrative purposes and that multiple WADs 5 are contemplated. As seen in FIG. 4, the WAD system 5 includes an RF transmitter device 55 for generating and transmitting RF energy of a particular frequency range for powering the WADs 5 as described herein and a receiver device 60 (including suitable processing electronics) for receiving and processing the RF information signals that are generated and transmitted by the WADs 5 as described herein. The RF transmitter device 55 and the receiver device 60 may be located remotely from one another or may be co-located (in which case they may, although not necessarily, be included within the same apparatus such as an RFID interrogator). In addition, the WAD system 50 includes a defined device region 65 in which the WADs 5 are intended/designed to be able operate properly (i.e., receive power and transmit information as described herein). Outside of the defined device region 65, it is likely that a WAD 5 will not properly function due to an inability to receive power from the RF transmitter device 55, an inability to successfully transmit information to the receiver device 60, or both.

Figure 5:
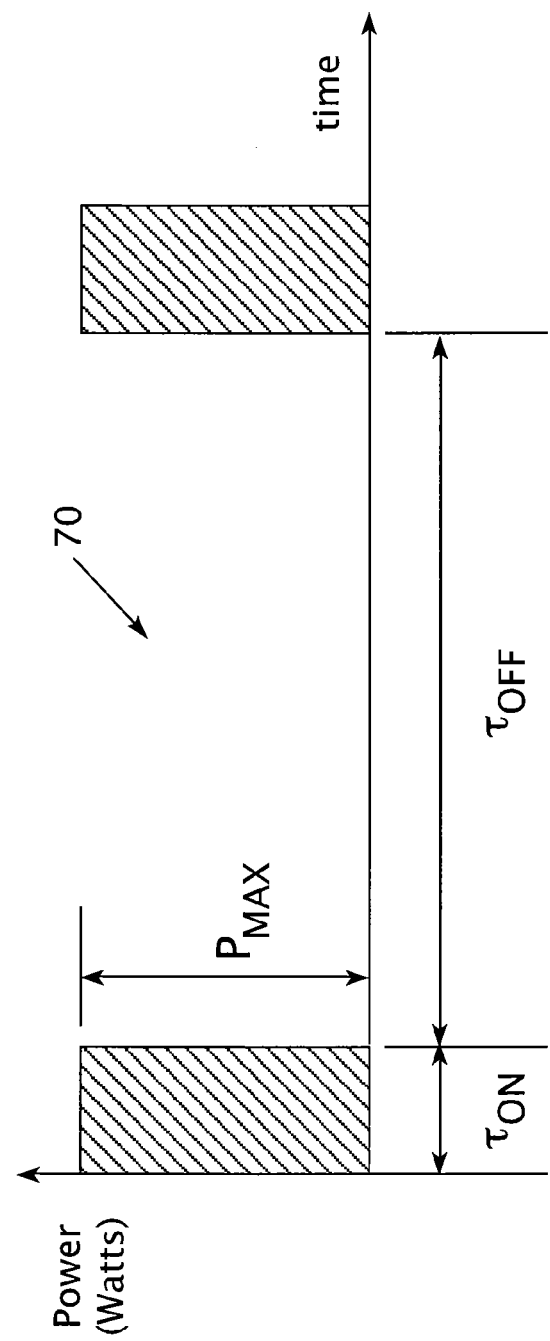
FIG. 5 is a schematic illustration of an RF transmitting profile that may be used to provide power to a wireless autonomous device as shown in FIG. 1.

Traditionally, WADs such as WAD 5 have been powered by RF energy in the form of continuous wave (CW) energy. Alternatively, as described in co-pending U.S. application Ser. No. 11/619,770, entitled "A Wireless Autonomous Device System" and owned by the assignee hereof, the disclosure of which is incorporated herein by reference, WADs such as WAD 5 may be powered by RF energy in the form of periodically pulsed RF energy. FIG. 5 is a schematic illustration of an RF transmitting profile 70 that may be transmitted by an RF source, such as the RF transmitting device 55 shown in FIG. 4, to provide power to a WAD 5 as shown in FIG. 1. As seen in FIG. 5, the RF transmitting profile 70 is a repeating, periodic pulsed profile wherein RF energy of a particular RF frequency range is transmitted during a time period $\tau_{ON}$ and wherein no RF energy is transmitted during a time period $\tau_{OFF}$. In this sense, the RF transmitting profile 70 may be said to be an amplitude modulated (AM) profile wherein the carrier frequency is modulated in an ON/OFF fashion. In order to implement the various embodiments of the invention described herein, a portion of the on-board electronic circuitry 15 (e.g., a processing unit provided as a part thereof) of each WAD 5 is able to sense the trailing edge of each power pulse included within a pulsed RF transmitting profile (such as is shown in FIG. 5) by sensing that the associated energy harvesting circuitry 10 in the WAD 5 is outputting a reduced DC voltage. The on-board electronic circuitry 15 is also able to count each of these events (an interrupt). The importance of this functionality to the various embodiments of the present invention will be described in greater detail below.

Furthermore, as is known in the art, the Federal Communications Commission (FCC) regulates the amount of energy/power that can be transmitted in a given amount of time in terms of what is known as effective average power or effective isotopic radiated power. Essentially, the regulations state that over a given time period, $T_{AVG-REG}$, no more than a specified average power, $P_{AVG-REG}$, may be transmitted by an RF source. In addition, the FCC also, in many instances, regulates the maximum power, $P_{MAX-REG}$, that can be transmitted at any time during $T_{AVG-REG}$. Thus, an optimum profile 70 for energy harvesting purposes may be chosen in the following manner. First, $\tau_{ON}+\tau_{OFF}$ is set equal to $T_{AVG-REG}$. It is then known that $P_{AVG-REG} \cdot (\tau_{ON}+\tau_{OFF})$ equals some energy value E. It is also known that it is desired that $\tau_{ON} \cdot P_{MAX}=E$, where $P_{MAX}$ is the power level that is to be transmitted during $\tau_{ON}$ and is set to either $P_{MAX-REG}$ in situations where the $P_{MAX-REG}$ regulations apply or, in the event that the $P_{MAX-REG}$ regulations do not apply, to the maximum power that is practically possible in the given situation/application (e.g., as dictated by the RF source being used and/or the environment in which the RF source is being implemented). Thus, since $P_{MAX}$ and E are known, one can solve for $\tau_{ON}$. As will be appreciated, this will result in a specific RF transmitting profile 70 wherein the maximum power and voltage level are transmitted by the RF source for the maximum limited time that still allows the RF transmitting profile 70 to satisfy the effective average power regulations. From an energy harvesting standpoint, when the maximum power and voltage level are transmitted, the maximum energy can be harvested.

In addition, as also described in co-pending U.S. application Ser. No. 11/619,770 identified above, a pulsed RF transmitting profile (for example having a form similar to the RF transmitting profile 70 shown in FIG. 5) that is used to provide power to one or more WADs 5 as described herein may also be used to simultaneously communicate information to the WADs 5 (as is well known, information may also be transmitted to WADs 5 when CW RF energy is used by employing, for example, an appropriate modulation scheme). For example, FIG. 6 is a schematic illustration of a pulsed RF transmitting profile 100 including pulses 105 that may be used to provide power by energy harvesting to one or more WADs 5 as described herein while simultaneously communicating information to the WADs 5 based on the state changes occurring in the RF transmitting profile 100. In the particular embodiment shown in FIG. 6, the RF transmitting profile 100 may be utilized to communicate information to one or more WADs 5 using a Manchester encoding scheme in which each bit of data is signified by at least one transition and wherein each bit is transmitted over a predefined time period, shown as time T in FIG. 6. As seen in FIG. 6, a high to low transition/state change within the time period T as a result of a pulse 105 represents a logic 0 and a low to high transition/state change within the time period T as a result of a pulse 105 represents a logic 1. This logic scheme can also be reversed to indicate 1, 0 respectively. As also seen in FIG. 6, this will result in the widths of the pulses 105 being varied in order to convey the appropriate information via a state change. As is known, Manchester encoding is considered to be self-clocking, which means that accurate synchronization of a data stream is possible. In this embodiment, a portion of the on-board electronic circuitry 15 (e.g., a processing unit provided as a part thereof) of each WAD 5 is programmed to recognize the leading and trailing edge of each of the pulses 105 and decode the information therein based on the Manchester encoding scheme that is employed. As will be appreciated, other encoding schemes based on the recognition of changes of state and/or the widths of the pulses are possible, such as, without limitation, the differential Manchester encoding scheme shown in FIG. 7 and implemented by pulsed RF transmitting profile 110 including pulses 115. As is known, in differential Manchester encoding, one of the two bits, logic 0 or logic 1, is represented by no transition at the beginning of a pulse period (T) and a transition in either direction at the midpoint of a pulse period, and the other of the two bits is represented by a transition at the beginning of a pulse period (T) and a transition at the midpoint of the pulse period. Another example encoding scheme, described in more detail in co-pending U.S. application Ser. No. 11/619,770 identified elsewhere herein, employs a pulsed RF transmitting profile that includes a number of periodically spaced power/synchronization pulses and a number of data pulses. In such a scheme, the on-board electronic circuitry 15 of each WAD 5 is programmed to recognize each of the power/synchronization pulses (for example, by detecting a voltage output by the energy harvesting circuit 10 thereof having a duration equal to the duration of each power/synchronization pulse, by detecting a voltage level output by the energy harvesting circuit 10 that would correspond to the power of the power/synchronization pulses, or by some other suitable means) and determine whether a data pulse is present in between each of the power/synchronization pulses. A scheme may then be established wherein if a data pulse is present, that represents a logic 1, and if no data pulse is present, that represents a logic 0. As will be appreciated, the scheme may be reversed such that the presence of a data pulse represents a logic 0 and the absence of a data pulse represents a logic 1.

What each of the schemes described above have in common is that they simultaneously power and communicate information to the WADS 5. Moreover, in the various embodiments described herein, it is possible to continuously communicate from an RF source, such as the RF transmitter device 55 shown in FIG. 4, to a WAD 5 in order to send a message of arbitrary length from the RF source to the WAD 5. This may be accomplished so long as the pulses that are used in the particular pulsed RF transmitting profile are either close enough together or long enough to always keep the DC voltage that is generated by the energy harvesting circuitry 10 of the WAD 5 above the minimum operational voltage required by the WAD 5 (i.e., the voltage required by the on-board electronic circuitry 15 and the transmitter circuitry 20 thereof).

The present invention provides a method of obtaining information from a WAD, such as WAD 5, in a WAD system, such as the WAD system 50, that reduces the amount of power transmitted by the WAD which is adapted to transmit a single bit on queue to represent the information of interest. For illustrative purposes, the WAD 5 shown in FIG. 1 will be used in describing the embodiments of the present invention, although it should be approximated that this is meant to be exemplary only and that other WAD embodiments may also be used. In the present invention, it is assumed that in the WAD system 50, the WADs 5 are to communicate information representing a data element having the form of a fixed length bit profile and being a particular fixed length bit string to a base station comprising the RF transmitter device 55 and the receiver device 60. The data element may represent, for example and without limitation, a sensor measurement such as temperature that was made by each WAD 5, in which case each possible data element (each possible bit string combination) would represent a particular sensor measurement (e.g., a particular temperature).

Figure 8:
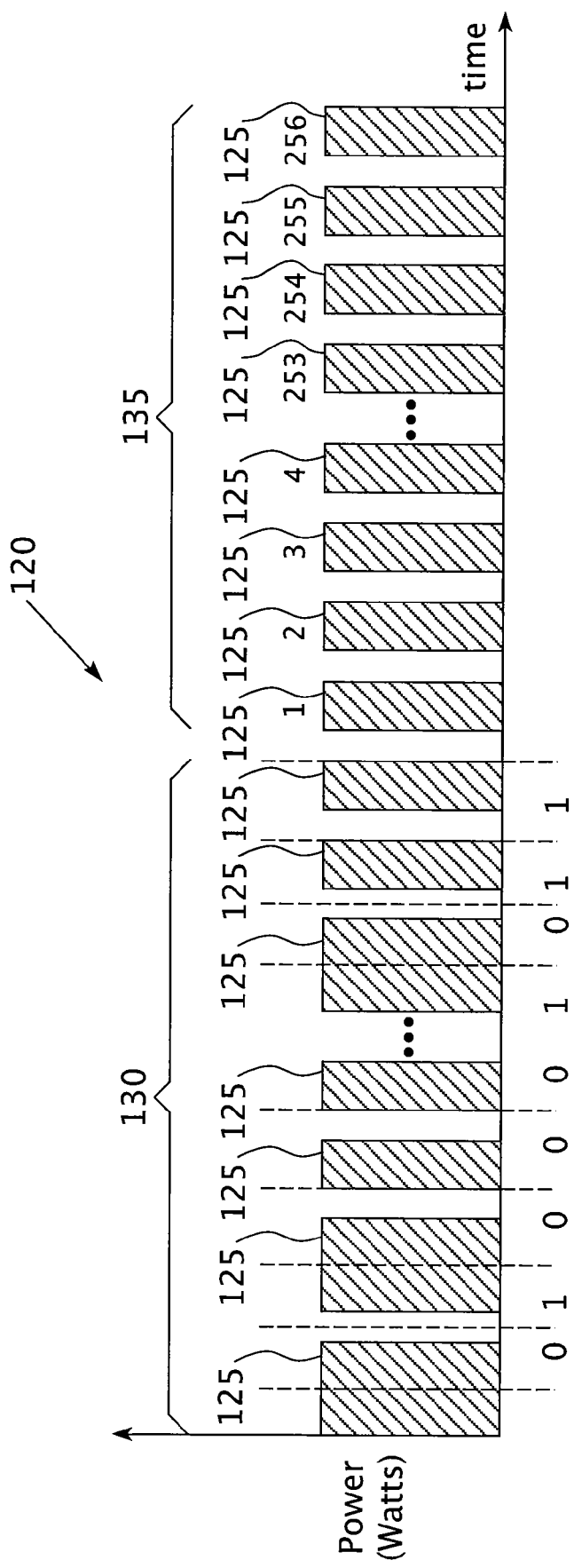
FIG. 8 is a schematic illustration of one embodiment of an RF transmitting profile that may be employed in the method of the present invention shown in FIG. 10.
Figure 9:
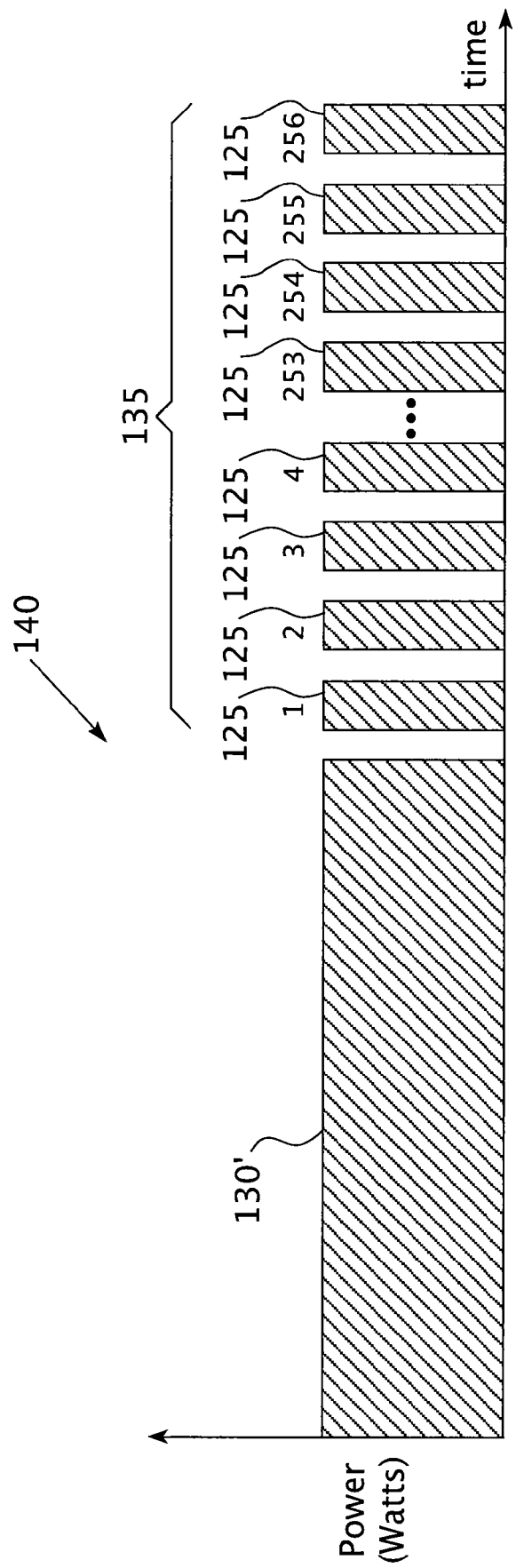
FIG. 9 is a schematic illustration of another embodiment of an RF transmitting profile that may be employed in the method of the present invention shown in FIG. 10.

FIG. 8 is a schematic illustration of an RF transmitting profile 120 according to one embodiment that may be employed in the method of the present invention. As seen in FIG. 8, the RF transmitting profile 120 includes a number of pulses 125. Furthermore, the RF transmitting profile 120 includes a preamble portion 130 including a first plurality of the pulses 125 and a triggering portion 135 including a second plurality of the pulses 125. The preamble portion 130 includes information which enables each WAD 5 to synchronize itself with the base station and to identify the beginning of the triggering portion 135. The preamble portion 130 may also include ID information which uniquely identifies each WAD 5 to indicate to each WAD 5 when it is its turn to communicate with the base station. In the RF transmitting profile 120, the information in the preamble portion 130 is communicated in the form of a pulsed profile as described elsewhere herein (e.g., in the form of Manchester encoding as shown in FIGS. 6 and 7). In addition, the number of pulses 125 in the triggering portion 135 is equal to the total number of possible bit strings that may form the data element. For example, if the data element is in the form of an 8-bit bit profile (an 8-bit word), the total number of possible bit string combinations that may form the data element would be 256 (00000000, 00000001, 00000010 . . . 11111111), and thus the number of pulses 125 in the triggering portion 135 would be 256. FIG. 9 is a schematic illustration of an RF transmitting profile 140 according to an alternate embodiment that may also be employed in the method of the present invention. In the RF transmitting profile 140, the triggering portion 135 is the same as is shown in FIG. 8, but the preamble portion 130', instead of comprising pulsed RF energy (as is the case in the preamble portion 130 shown in FIG. 8), comprises CW RF energy.

Figure 10:
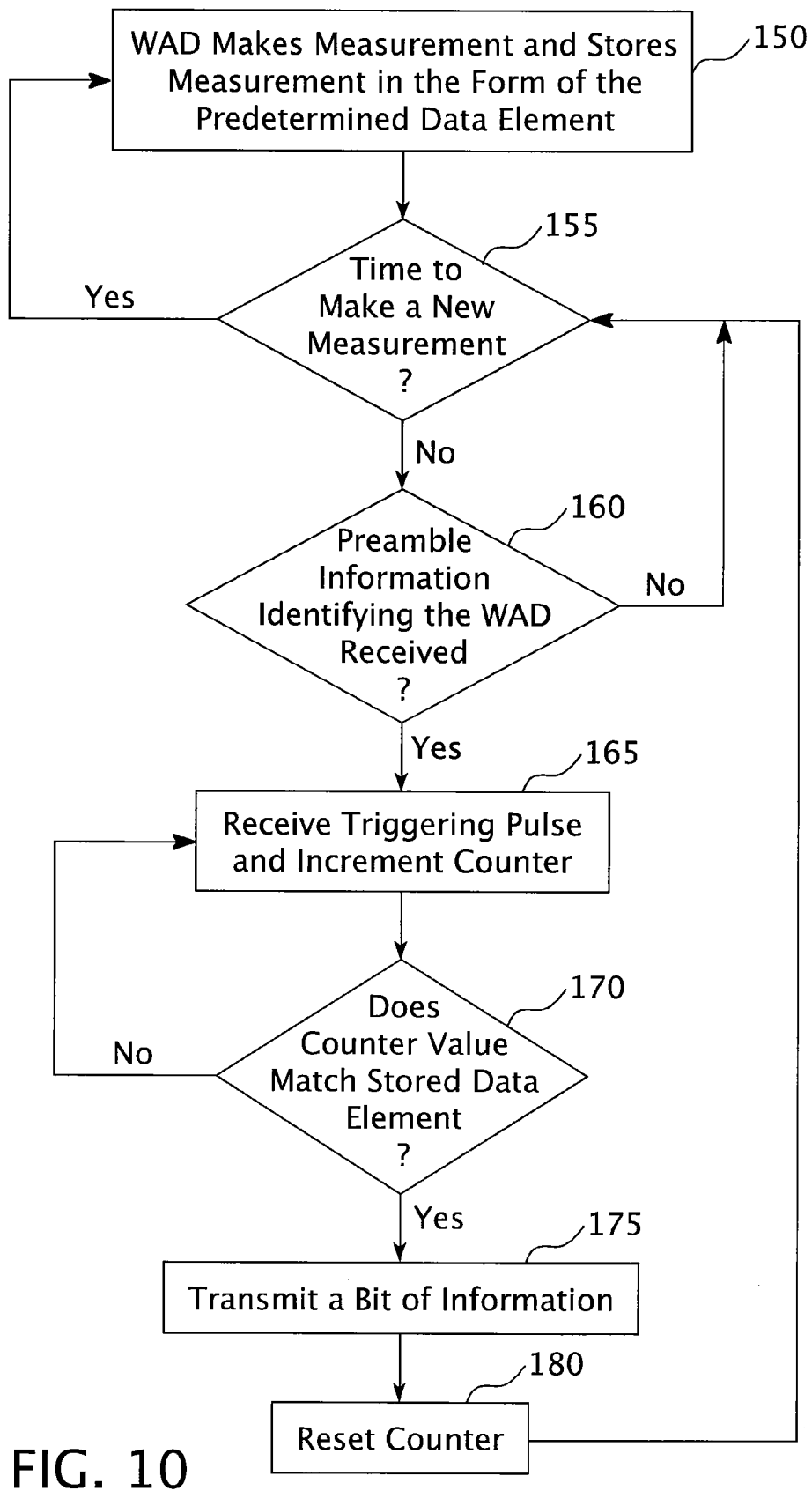
FIG. 10 is a flowchart showing one embodiment of a method of obtaining information from a wireless autonomous device, such as the wireless autonomous device shown in FIG. 1, which reduces the amount of power transmitted by the wireless autonomous device while communicating information to a base station.

FIG. 10 is a flowchart illustrating one embodiment of a method of communicating information from a WAD 5 to a base station according to the present invention. For illustrative purposes, the method shown in FIG. 10 assumes that each WAD 5 is provided with at least one sensor for measuring a particular parameter. In addition, the method shown in FIG. 10 assumes that multiple WADs 5 are present in the system in question, although it should be appreciated that this is not necessary and that the method, modified as described below, may be used in a system employing only a single WAD 5. The steps shown in FIG. 10 are directed to a single WAD 5, but, as will be appreciated, where multiple WADs 5 are employed, the steps would apply to each one. Finally, the method of FIG. 10 assumes that an RF transmitting profile such as RF transmitting profile 120 or 140 is transmitted by a base station.

The method begins at step 150, wherein the WAD 5 measures the parameter and stores the measurement data in the form of a predetermined data element as described above. Next, at step 155, a determination is made as to whether it is time for the WAD 5 to make a new measurement. If the answer at step 155 is yes, then the method returns to step 150. If, however, the answer at step 155 is no, then, at step 160, a determination is made as to whether the WAD 5 has received from the associated base station preamble information 130 or 130' (depending upon which RF transmitting profile is used) which identifies that particular WAD 5. If the answer at step 160 is no, then the method returns to step 155. However, if the answer at step 160 is yes (meaning the particular WAD 5 has been identified and thus it is it's turn to communicate), then, at step 165, the WAD 5 receives the next triggering pulse 125 in the RF transmitting profile 120,140 (which immediately after the preamble information 130,130' will be the first such pulse) and increments a counter (initially set to zero) provided as part of the WAD 5. Next, at step 170, a determination is made as to whether the counter value following step 165 matches the stored data element. For example, if the data element in question is an 8-bit bit string, a determination is made as to whether the number of triggering pulses 125 that have been received (as indicated by the value of a counter) matches up with the number that is represented by the data element in binary form. For instance, if the WAD made a temperature measurement in step 150 that is represented by and stored as an 8-bit bit string that corresponds to the decimal number 150 in binary form, then the answer at step 170 would be yes when the counter is incremented to the number 150 (i.e., after 150 triggering pulses 125 have been received). If the answer at step 170 is no, then the method returns to step 165. If the answer at step 170 yes, meaning that the counter value matches the stored data element, then, at step 175, the WAD 5 wirelessly transmits a single bit of information to the base station. The base station in the present invention is similarly adapted to count the number of triggering pulses that it has transmitted. Thus, upon receiving the single bit of information from the WAD 5, the base station will be able to determine that it was transmitted in response to a particular one of the triggering pulses 125. As a result, the base station will be able to determine the value of the stored data element based upon the triggering pulse count that it has maintained. As will be appreciated, for the base station and the WAD 5 to be properly synchronized, the bit of information transmitted in step 175 must be received by the base station before it transmits the next triggering pulse 125 (e.g., if the single bit of information is received after the transmission of the 150$^{th}$ triggering pulse 125 and before the transmission of the 151$^{st}$ triggering pulse 125, the base station will know that the stored data element is the binary number representing the decimal number 150). Following step 175, the method, at step 180, causes the counter of the WAD 5 to be reset to zero. Then, the method returns to step 155.

In the situation where only a single WAD 5 is employed in the system, the preamble portion 130,130' need not include any information which uniquely identifies the WAD 5. As a result, step 160 in such a situation would only need to determine whether the preamble portion 130,130' has been received and based thereon the WAD 5 will be able to determine when to start counting triggering pulses 125.

The power that is necessary to perform steps 150 to 160 is preferably provided by RF energy that is transmitted from the base station and harvested by the WAD 5 as described herein. In addition, the power that is required for steps 165 through 180 is preferably provided by the RF transmitting profile 120,140 (or other suitable profile) that includes the preamble portion 130,130' and the triggering portion 135. As will be appreciated, the method shown in FIG. 10 does not require the pulses received from the base station to be of an equal time duration because the only requirement is that the number of pulses must be able to be counted by the WAD 5. If there is a concern about noise in the communication channel, the RF transmitting profile 120,140 that includes the preamble portion 130,130' and the triggering portion 135 may be repeated. Such repetition allows the energy on the WAD 5 to build up so that power for transmission is no longer a concern.

As an example, baud rates of 19,200 may be achieved with a WAD 5. If one assumes a 64 bit preamble portion 130 or 130' and an 8-bit data element for representing the measurements, a total of 320 bit periods (64 plus 256) would be required to request and receive from the WAD 5 information which communicates the data element representing the measurement while using a single bit transmission from the WAD 5. Furthermore, assuming an inter-measurement delay of 320 bits between base station interrogations would provide for a sampling rate of one sample per 640 bits at a baud rate of 19,200, which is a sample rate of 30 samples per second.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of communicating information from a wireless autonomous device to a base station, said wireless autonomous device having a stored data element having the form of a predetermined profile, said predetermined profile having a total number of possible data element combinations, said possible data element combinations having a sequence, said stored data element being one of said possible data element combinations and being a particular number in the sequence, the method comprising:

receiving at said wireless autonomous device RF energy in the form of an RF transmitting profile transmitted by said base station, said RF transmitting profile including a triggering portion comprising a plurality of pulses, the number of said pulses being at least equal to said total number of possible data element combinations;

keeping a count of received pulses at said wireless autonomous device by counting each of said pulses when said pulses are received by said wireless autonomous device;

wirelessly transmitting a piece of data to said base station from said wireless autonomous device when said count of received pulses reaches a value equal to said particular number in the sequence;

receiving said piece of data at said base station; and using the receipt of said piece of data at said base station to determine which of said possible data element combinations said stored data element is.

2. The method according to claim 1, wherein said predetermined profile is a fixed length bit profile, wherein said stored data element is a particular fixed length bit string, and wherein said possible data element combinations are possible bit string combinations.

3. The method according to claim 1, wherein said RF transmitting profile further includes a preamble portion prior to said triggering portion, said method further comprising using said preamble portion to determine when to begin said step of keeping a count of received pulses.

4. The method according to claim 3, wherein said preamble portion includes device identifying information, said method further comprising determining at said wireless autonomous device whether said device identifying information identifies said wireless autonomous device, wherein said keeping and transmitting steps are only performed if it is determined that said device identifying information identifies said wireless autonomous device.

5. The method according to claim 3, wherein said preamble portion comprises pulsed RF energy.

6. The method according to claim 3, wherein said preamble portion comprises continuous wave RF energy.

7. The method according to claim 1, wherein said using step comprises using the timing of the receipt of said piece of data at said base station to determine which of said possible data element combinations said stored data element is.

8. The method according to claim 2, wherein said fixed length bit profile is an 8-bit bit profile and wherein said total number of possible data element combinations is 256.

9. The method according to claim 1, further comprising using said RF energy in the form of an RF transmitting profile to provide power to said wireless autonomous device.

10. The method according to claim 9, wherein said step of using said RF energy in the form of an RF transmitting profile to provide power to said wireless autonomous device comprises converting at least a portion of said RF energy to DC power and using said DC power to provide power to one or more components of said wireless autonomous device.

11. The method according to claim 1, wherein said wireless autonomous device is structured to make a measurement and wherein said stored data element represents said measurement.

12. The method according to claim 1, further comprising keeping a count of transmitted pulses on said base station by counting the pulses transmitted by said base station as part of said triggering portion of said RF transmitting profile as said pulses are transmitted, wherein said using step uses a value of said count of transmitted pulses when said piece of data is received by said base station to determine which of said possible data element combinations said stored data element is.

13. The method according to claim 1, wherein said piece of data is one bit of data.

14. The method according to claim 1, wherein said piece of data includes one or more bits of data.

15. A wireless autonomous device system, comprising:
a base station; and
at least one wireless autonomous device, said at least one wireless autonomous device having a stored data element having the form of a predetermined profile, said predetermined profile having a total number of possible data element combinations, said possible data element combinations having a sequence, said stored data element being one of said possible data element combinations and being a particular number in the sequence;
wherein said base station is structured to transmit to said wireless autonomous device RF energy in the form of an RF transmitting profile, said RF transmitting profile including a triggering portion comprising a plurality of pulses, the number of said pulses being equal to said total number of possible data element combinations;
wherein said wireless autonomous device is structured to receive said RF energy, keep a count of received pulses by counting each of said pulses when said pulses are received, and wirelessly transmit a piece of data to said base station when said count reaches a value equal to said particular number in the sequence; and
wherein said base station is structured to receive said piece of data and use the receipt of said piece of data to determine which of said possible data element combinations said stored data element is.

16. The system according to claim 15, wherein said base station is structured to use the time of receipt of said piece of data at said base station to determine which of said possible data element combinations said stored data element is.

17. The system according to claim 15, wherein said base station is structured to keep a count of the pulses transmitted as part of said triggering portion of said RF transmitting profile as said pulses are transmitted and use a value of said count of the pulses transmitted when said piece of data is received by said base station to determine which of said possible data element combinations said stored data element is.

18. The system according to claim 15, wherein said predetermined profile is a fixed length bit profile, wherein said stored data element is a particular fixed length bit string, and wherein said possible data element combinations are possible bit string combinations.

19. The system according to claim 15, wherein said wireless autonomous device includes a sensor structured to make a measurement and wherein said stored data element represents said measurement.

20. The system according to claim 15, wherein said wireless autonomous device includes energy conversion circuitry, said energy conversion circuitry converting at least a portion of said RF energy to DC power, said DC power being used to provide power to one or more components of said wireless autonomous device.

* * * * *

UNITED STATES PATENT AND TRADEMARK OFFICE
CERTIFICATE OF CORRECTION

PATENT NO. : 8,391,375 B2
APPLICATION NO. : 11/743938
DATED : March 5, 2013
INVENTOR(S) : David W. Sammel, Jr.

It is certified that error appears in the above-identified patent and that said Letters Patent is hereby corrected as shown below:

In the Specification

Column 1, line 35, "electronics, such and" should read --electronics, such as--.
Column 5, line 67, "operate" should read --to operate--.
Column 7, line 66, "WADS 5" should read --WADs 5--.
Column 9, line 27, "it's" should read --its--.
Column 9, line 39, "WAD" should read --WAD 5--.
Column 9, line 46, "step 170 yes," should read --step 170 is yes,--.

Signed and Sealed this
Twenty-fifth Day of June, 2013

Teresa Stanek Rea
*Acting Director of the United States Patent and Trademark Office*